(12) United States Patent
Way et al.

(10) Patent No.: US 11,090,628 B2
(45) Date of Patent: Aug. 17, 2021

(54) CATALYTIC MEMBRANE REACTOR, METHODS OF MAKING THE SAME AND METHODS OF USING THE SAME FOR DEHYDROGENATION REACTIONS

(71) Applicant: Colorado School of Mines, Golden, CO (US)

(72) Inventors: James Douglas Way, Boulder, CO (US); Colin A. Wolden, Denver, CO (US)

(73) Assignee: Colorado School of Mines, Golden, CO (US)

( * ) Notice: Subject to any disclaimer, the term of this patent is extended or adjusted under 35 U.S.C. 154(b) by 0 days.

(21) Appl. No.: 16/799,642

(22) Filed: Feb. 24, 2020

(65) Prior Publication Data

US 2020/0269208 A1    Aug. 27, 2020

Related U.S. Application Data

(60) Provisional application No. 62/809,338, filed on Feb. 22, 2019.

(51) Int. Cl.
  B01J 19/00         (2006.01)
  B01J 19/24         (2006.01)
  (Continued)

(52) U.S. Cl.
  CPC .......... B01J 19/2475 (2013.01); B01D 69/10 (2013.01); C01B 3/047 (2013.01); C01B 3/505 (2013.01);
  (Continued)

(58) Field of Classification Search
  CPC ........ B01D 69/00; B01D 69/10; B01D 71/00; B01D 71/02; B01D 71/022;
  (Continued)

(56) References Cited

U.S. PATENT DOCUMENTS 4,865,630 A * 9/1989 Abe .................. B01J 8/009
                                                  96/11
8,951,931 B2 * 2/2015 Ogawa ............... B01J 35/04
                                                  502/182

OTHER PUBLICATIONS

"Hydrogen fuel quality specifications for polymer electrolyte membrane fuel cells in road vehicles," Report to the Safety, Codes and Standards Program, Fuel Cell Technologies Office, U.S. Department of Energy, Nov. 2, 2016, retrieved from https://www.energy.gov/sites/prod/files/2017/01/f34/fcto_h2_fuel_quality_specs_pem_fc_road_vehicles.pdf, 86 pages.

(Continued)

*Primary Examiner* — Natasha E Young
(74) *Attorney, Agent, or Firm* — Sheridan Ross P.C.

(57) ABSTRACT

A catalytic membrane reactor and methods of operating and producing the same are provided that efficiently produces highly pure hydrogen ($H_2$) from ammonia ($NH_3$) as well as operates according to other chemical conversion processes. In one embodiment, a tubular ceramic support made from porous yttria-stabilized zirconia has an outer surface that is impregnated with a metal catalyst such as ruthenium and then plated with a hydrogen permeable membrane such as palladium. An inner surface of the ceramic support is impregnated with cesium to promote conversion of ammonia to hydrogen and nitrogen ($N_2$). The resulting catalytic membrane reactor produces highly pure hydrogen at low temperatures and with less catalytic loading. Therefore, ammonia can be used to effectively transport hydrogen for use in, for example, fuel cells in a vehicle.

20 Claims, 6 Drawing Sheets

(51) Int. Cl.
| | |
|---|---|
| *B01D 69/10* | (2006.01) |
| *B01D 71/02* | (2006.01) |
| *C01B 3/04* | (2006.01) |
| *C01B 3/50* | (2006.01) |

(52) U.S. Cl.
CPC ........ *B01D 71/022* (2013.01); *B01D 2323/46* (2013.01); *B01D 2325/20* (2013.01); *C01B 2203/0405* (2013.01); *C01B 2203/1082* (2013.01); *C01B 2203/1094* (2013.01)

(58) Field of Classification Search
CPC ............ B01D 2323/00; B01D 2323/46; B01D 2325/00; B01D 2325/20; B01J 19/00; B01J 19/24; B01J 19/2475; C01B 3/00; C01B 3/02; C01B 3/04; C01B 3/047; C01B 3/50; C01B 3/501; C01B 3/503; C01B 3/505; C01B 2203/00; C01B 2203/04; C01B 2203/0405; C01B 2203/1041; C01B 2203/1082; C01B 2203/1094
See application file for complete search history.

(56) References Cited

OTHER PUBLICATIONS

"Renewables," International Energy Agency, 2017, 189 pages.
Alagharu et al., "Analysis of ammonia decomposition reactor to generate hydrogen for fuel cell applications," Journal of Power Sources, vol. 195, Aug. 19, 2009, pp. 829-833.
Alazemi et al., "Automotive hydrogen fuelling stations: An international Review," Renewable and Sustainable Energy Reviews, vol. 48, 2015, pp. 483-499.
Apodaca, "2014 Minerals Yearbook: Nitrogen," US Geological Survey, 2014, retrieved from https://s3-us-west-2.amazonaws.com/prd-wret/assets/palladium/production/mineral-pubs/nitrogen/myb1-2014-nitro.pdf, 15 pages.
Apodaca, "Nitrogen (Fixed)-Ammonia," US Geological Survey, Jan. 2017, retrieved from https://s3-us-west-2.amazonaws.com/prd-wret/assets/palladium/production/mineral-pubs/nitrogen/mcs-2017-nitro.pdf, 2 pages.
Bicer et al., "Life cycle environmental impact assessments and comparisons of alternative fuels for clean vehicles," Resources, Conservation, and Recycling, vol. 132, May 2018, pp. 141-157. Abstract Only.
Bird, "Transport phenomena," Applied Mechanics Reviews, vol. 55, No. 1, Jan. 1, 2002, pp. R1-R4. Abstract Only.
Bradford et al., "Kinetics of NH3Decomposition over Well Dispersed Ru," Journal of Catalysis, vol. 172, No. 2, Dec. 1997, p. 479.
Broom et al., "Irreproducibility in hydrogen storage material research," Energy & Environmental Science, vol. 9, Sep. 14, 2016, pp. 3368-3380.
Chellappa et al., "Ammonia decomposition kinetics over Ni-Pt/Al2O3 for PEM fuel cell applications," Applied Catalysis A: General, vol. 227, No. 1-2, Mar. 8, 2002, pp. 231-240. Abstract Only.
Chiuta et al., "Design and operation of an ammonia-fueled microchannel reactor for autothermal hydrogen production," Catalysis Today, vol. 310, Jul. 15, 2018 pp. 187-194. Abstract Only.
Chiuta et al., "Reactor technology options for distributed hydrogen generation via ammonia decomposition: A review," International Journal of Hydrogen Energy, vol. 38, No. 35, Nov. 22, 2013, pp. 14968-14991. Abstract Only.
Choudhary et al., "Catalytic ammonia decomposition: COx-free hydrogen production for fuel cell applications," Catalysis Letters, vol. 72, No. 3-4, Jan. 8, 2001, pp. 197-201.
Collins et al., "Preparation and characterization of a composite palladium-ceramic membrane," Industrial & Engineering Chemistry Research, vol. 32, No. 12, Dec. 1, 1993, pp. 3006-3013.
Collins, "Catalytic Decomposition of Ammonia in a Membrane Reactor," A Thesis Submitted to Oregon State University in partial fulfillment of the requirements for the degree of Doctor of Philosophy, Jun. 24, 1993, 209 pages.
Dittmeyer et al., "Membrane reactors for hydrogenation and dehydrogenation processes based on supported palladium," Journal of Molecular Catalysis A: Chemical, vol. 173, No. 1-2, Sep. 10, 2001, pp. 135-184. Abstract Only.
Eberle et al., "Chemical and Physical Solutions for Hydrogen Storage," Angewandte Chemie International Edition, vol. 48, No. 36, Aug. 25, 2009, pp. 6608-6630.
El Hawa et al., "Steam methane reforming in a Pd—Au membrane reactor: Long-term assessment," International Journal of Hydrogen Energy, vol. 41, May 20, 2016, pp. 10193-10201.
Eppinger et al., "Formic Acid as a Hydrogen Energy Carrier," ACS Energy Letters, vol. 2, No. 1, Dec. 15, 2016, pp. 188-195.
Fairbanks et al., "Diffusion Coefficients in Multicomponent Gas Mixtures," Industrial and Engineering Chemistry, vol. 42, No. 3, Mar. 1, 1950, pp. 471-475. Abstract Only.
Felderhoff et al., "Hydrogen storage: the remaining scientific and technological challenges," Physical Chemistry Chemical Physics, vol. 9, 2007, pp. 2643-2653.
Ganley et al., "Development of a microreactor for the production of hydrogen from ammonia," Journal of Power Sources, vol. 137, Jul. 27, 2004, pp. 53-61.
Ganley et al., "Porous anodic alumina microreactors for production of hydrogen from ammonia," AIChE Journal, vol. 50, No. 4, Apr. 2004, pp. 829-834.
Garcia-Garcia et al., "High purity hydrogen production by low temperature catalytic ammonia decomposition in a multifunctional membrane reactor," Catalysis Communications, vol. 9, 2008, pp. 482-486.
Giddey et al., "Ammonia as a Renewable Energy Transportation Media," ACS Sustainable Chemistry & Engineering, vol. 5. No. 11, Sep. 27, 2017, pp. 10231-10239. Abstract Only.
Gotz et al., "Renewable Power-to-Gas: A technological and economic review," Renewable Energy, vol. 85, 2016, pp. 1371-1390.
Hill et al., "In-situ H2 production via low temperature decomposition of ammonia: Insights into the role of cesium as a promoter," International Journal of Hydrogen Energy, vol. 39, Apr. 13, 2014, pp. 7646-7654.
Hill et al., "Low temperature H2 production from ammonia usingruthenium-based catalysts: Synergetic effect of promoter and support," Applied Catalysis B: Environmental, vol. 172-173, Feb. 11, 2015, pp. 129-135.
Huang et al., "Preparation of Ru—Cs catalyst and its application on hydrogen production by ammonia decomposition," International Journal of Hydrogen Energy, vol. 38, No. 8, Mar. 19, 2013 pp. 3233-3240. Abstract Only.
Israni et al., "Hydrogen generation and purification in a composite Pd hollow fiber membrane reactor: Experiments and modeling," Catalysis Today, vol. 139, May 15, 2008, pp. 299-311.
Itoh et al., "Kinetic enhancement of ammonia decomposition as a chemical hydrogen carrier in palladium membrane reactor," Catalysis Today, vol. 236, Part A, Nov. 1, 2014, pp. 70-76. Abstract Only.
Jena, "Materials for Hydrogen Storage: Past, Present, and Future," Journal of Physical Chemistry Letters, vol. 2, No. 3, Jan. 13, 2011, pp. 206-211. Abstract only.
Jo et al., "A viable membrane reactor option for sustainable hydrogen production from ammonia," Journal of Power Sources, vol. 400, Oct. 1, 2018, pp. 518-526. Abstract Only.
Karim et al., "Correlating Particle Size and Shape of Supported Ru/y-Al2O3 Catalysts with NH3 Decomposition Activity" Journal of the American Chemical Society, vol. 131, 2009, pp. 12230-12239.
Klerke et al., "Ammonia for hydrogen storage: challenges and opportunities," Journal of Materials Chemistry, vol. 18, No. 20, Apr. 3, 2008, pp. 2304-2310.
Lackner et al., "The urgency of the development of CO2 capture from ambient air," PNAS, vol. 109, No. 33, Aug. 14, 2012, pp. 13156-13162.
Ley et al., "Complex hydrides for hydrogen storage—new perspectives," Materials Today, vol. 17, No. 3, Apr. 2014, pp. 122-129.

(56) References Cited

OTHER PUBLICATIONS

Li et al., "Ammonia decomposition over Ru and Ni catalysts supported on fumed SiO2, MCM-41, and SBA-15," Journal of Catalysis, vol. 236, No. 2, Dec. 10, 2005, pp. 181-189. Abstract Only.
Li et al., "Highly enhanced ammonia decomposition in a bimodal catalytic membrane reactor for COx-free hydrogen production," Catalysis Communications, vol. 15, No. 1, Nov. 15, 2011, pp. 60-63. Abstract Only.
Li et al., "Preparation of a novel bimodal catalytic membrane reactor and its application to ammonia decomposition for COx-free hydrogen production," International Journal of Hydrogen Energy, vol. 37, No. 17, Sep. 2012, pp. 12105-12113. Abstract Only.
Liu et al., "Microfibrous Entrapped Ni/Al2O3 Using S5-31 Fibers for H2 Production from NH3," AIChE Journal, vol. 53, No. 7, Jul. 2007, pp. 1845-1849.
Loffler et al., "Kinetics of NH3 decomposition on polycrystalline Pt," Journal of Catalysis, vol. 41, No. 3, Mar. 1976, pp. 440-454. Abstract Only.
Lundin et al., "Glass frit sealing method for macroscopic defects in Pd-based composite membranes with application in catalytic membrane reactors," Separation and Purification Technology, vol. 172, Jan. 1, 2017, pp. 68-75.
Ma et al., "A cost assessment study for a large-scale water gas shift catalytic membrane reactor module in the presence of uncertainty," Separation and Purification Technology, vol. 166, Jun. 22, 2016, pp. 205-212. Abstract Only.
Michel, "Editorial: The Nonsense of Biofuels," Angewandte Chemie International Edition, vol. 15, No. 11, Mar. 12, 2012, pp. 2516-2518.
Mladenov et al., "Modeling of transport and chemistry in channel flows of automotive catalytic converters," Chemical Engineering Science, vol. 65, No. 2, Jan. 16, 2010, pp. 812-826. Abstract Only.
Mukherjee et al., "Low-temperature ammonia decomposition catalysts for hydrogen generation," Applied Catalysis B: Environmental, vol. 226, Jun. 15, 2018, pp. 162-181. Abstract Only.
Pachauri et al., "Climate change 2014 synthesis report. Contribution of working groups I, II, and III to the fifth assessment report of the Intergovernmental Panel on Climate Change," IPCC, 2014, 168 pages.
Patki et al., "Rapid annealing of sequentially plated Pd-Au composite membranes using high pressure hydrogen," Journal of Membrane Science, vol. 513, Sep. 1, 2016, pp. 197-205. Abstract Only.
Raja et al., "A critical evaluation of Navier-Stokes, boundary-layer, and plug-flow models of the flow and chemistry in a catalytic-combustion monolith," Catalysis Today, vol. 59, 2000, pp. 47-60.
Satyapal et al., "The U.S. Department of Energy's National Hydrogen Storage Project: Progress towards meeting hydrogen-powered vehicle requirements," Catalysis Today, vol. 120, No. 3-4, Feb. 28, 2007, pp. 246-256. Abstract Only.
Saur et al., "U.S. Geographic Analysis of the Cost of Hydrogen from Electrolysis," National Renewable Energy Laboratory, Dec. 2011, 18 pages.
Schneider et al., "NIH Image to ImageJ: 25 years of Image Analysis," Nature Methods, vol. 9, No. 7, Jul. 2012, pp. 671-675.
Schuth et al., "Ammonia as a possible element in an energy infrastructure: catalysts for ammonia decomposition," Energy & Environmental Science, vol. 5, 2012, pp. 6278-6289.
Shen et al., "Behavior of H2 chemisorption on Ru/TiO2 surface and its application in evaluation of Ru particle sizes compared with TEM and XRD analyses," Applied Catalysis A: General, vol. 335, Nov. 19, 2007, pp. 187-195.
Sordakis et al., "Homogeneous Catalysis for Sustainable Hydrogen Storage in Formic Acid and Alcohols," Chemical Reviews, vol. 118, No. 2, Oct. 6, 2017, pp. 372-433. Abstract Only.
Szmigiel et al., "Ammonia decomposition over the ruthenium catalysts deposited on magnesium-aluminum spinel," Applied Catalysis A: General, vol. 264, Dec. 18, 2003, pp. 59-63.
Tamaru et al., "A "new" general mechanism of ammonia synthesis and decomposition on transition metals," Accounts of Chemical Research, vol. 21, No. 2, Feb. 1, 1988, p. 88.
Thomas et al., "Potential Roles of Ammonia in a Hydrogen Economy: A Study of Issues Related to the Use Ammonia for On-Board Vehicular Hydrogen Storage," U.S. Department of Energy, Feb. 2006, retrieved from https://www.energy.gov/sites/prod/files/2015/01/f19/fcto_nh3_h2_storage_white_paper_2006.pdf, 23 pages.
Veldsink et al., "The use of the dusty-gas model for the description of mass transport with chemical reaction in porous media," The Chemical Engineering Journal, vol. 57, 1995, pp. 115-125.
Yin et al., "A mini-review on ammonia decomposition catalysts for on-site generation of hydrogen for fuel cell applications," Applied Catalysis A: General, vol. 277, No. 1-2, Dec. 8, 2004, pp. 1-9. Abstract Only.
Yoo et al., "On the challenge of developing advanced technologies for electrochemical energy storage and conversion," Materials Today, vol. 17, No. 3, Apr. 2014, pp. 110-121.
Zeng et al., "Dechlorination process of active carbon-supported, barium nitrate-promoted ruthenium trichloride catalyst for ammonia synthesis," Applied Catalysis A: General, vol. 219, No. 1-2, Oct. 5, 2001, pp. 235-247. Abstract Only.
Zhang et al., "Efficient Ammonia Decomposition in a Catalytic Membrane Reactor to Enable Hydrogen Storage and Utilization," ACS Sustainable Chemistry and Engineering, vol. 7, No. 6, Feb. 27, 2019, pp. 5975-5985.
Zhang et al., "High-purity COx-free H2 generation from NH3 via the ultra permeable and highly selective Pd membranes," Journal of Membrane Science, vol. 277, No. 1-2, Jun. 1, 2006, pp. 85-93.
Zhu et al, "Metal-organic framework composites," Chemical Society Reviews, vol. 43, No. 16, Mar. 18, 2014, pp. 5468-5512. Abstract Only.
Zhu et al., "Modeling Elementary Heterogeneous Chemistry and Electrochemistry in Solid-Oxide Fuel Cells," Journal of the Electrochemical Society, vol. 152, No. 12, Nov. 4, 2005, pp. A2427-A2440.
Kume et al., "Development of Compact and Efficient Hydrogen Production Module with Membrane on Catalyst," International Gas Union Research Conference, Oct. 2011, 23 pages.
Plazaola et al., "Recent Advances in Pd-Based Membranes for Membrane Reactors," vol. 22, No. 51, Jan. 1, 2017, 53 pages.

* cited by examiner

CATALYTIC MEMBRANE REACTOR, METHODS OF MAKING THE SAME AND METHODS OF USING THE SAME FOR DEHYDROGENATION REACTIONS

CROSS REFERENCE TO RELATED APPLICATIONS

This application claims the priority to, and the benefit of, prior U.S. Provisional Patent Application No. 62/809,338, filed on Feb. 22, 2019, and entitled "CATALYTIC MEMBRANE REACTOR, METHODS OF MAKING THE SAME AND METHODS OF USING THE SAME", which application is incorporated herein by reference in its entirety.

GOVERNMENT LICENSE RIGHTS

This invention was made with government support under grant 0000785 awarded by the Department of Energy and grant 1512172 awarded by the National Science Foundation. The government has certain rights in the invention.

BACKGROUND

Renewable energy and electrification of the transportation sector have been promoted in an effort to reduce greenhouse gas emissions. However, electrification of the transport sector faces serious challenges because the batteries onboard electric vehicles suffer from low gravimetric and volumetric energy densities. As a result, vehicles powered by rechargeable batteries have limited driving range and excessively long recharging times. An alternative is fuel cell electric vehicles that are powered by hydrogen ($H_2$) and have driving ranges exceeding 600 km. However, the costs associated with the storage, transportation, and dispensing of hydrogen remains higher than traditional fuels. Conventional hydrogen storage in high-pressure compressed gas cylinders or cryogenic liquid tanks is straightforward, but suffers from excessive energy losses (compression, liquefaction, and boil-off) and low volumetric energy capacity. As such, there has been long efforts to develop alternative hydrogen carriers for storage and delivery.

Liquid fuels with high energy density include methanol, formic acid, and ammonia, and these fuels can be transported over long distances, stored for long times, and then decomposed to hydrogen at end-use sites. A liquid at ambient temperature and modest pressure (<10 bar), ammonia ($NH_3$) has a number of advantages over other liquid fuels. First, ammonia has a superior gravimetric density (17.7 wt. %) relative to either methanol (12.8%) or formic acid (4.34%). In addition, ammonia does not require management of carbon/CO species during either its synthesis or subsequent decomposition. Ammonia contains ~40% more hydrogen than liquid hydrogen on a volumetric basis, without concerns about boil off. A recent life cycle assessment concluded that renewable ammonia was second only to hydrogen among all fuels in terms of its environmental impact, and the round trip efficiency of renewable ammonia is significantly higher than liquid hydrogen.

The reconversion of ammonia to hydrogen and its purification are energy intensive steps that impact its round trip efficiency. Ammonia decomposition occurs through the following reaction:

$NH_3 \leftrightarrows 1/2 N_2 + 3/2 H_2$, $\Delta H° = 46.2$ kJ/mol

Packed bed reactors are commonly used to study catalysts for ammonia decomposition, but at scale packed bed reactors are inefficient and cannot meet the requirements with respect to weight and size required by distributed power systems. Even with considerable work developing reactor technologies, there remains a need to purify hydrogen from nitrogen and residual ammonia that can be catastrophic to sensitive systems such as proton exchange membrane fuel cells that have tolerance levels of less than 0.1 ppm. Moreover, reactors require temperatures in excess of 600° C. to fully decompose ammonia, which is undesirably high in most applications.

Figure 1A:
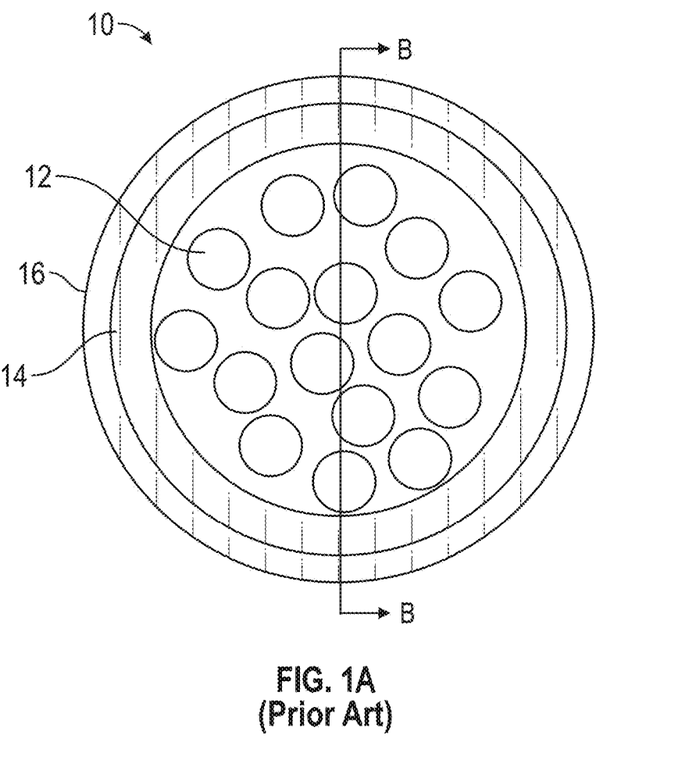
FIG. 1A is an elevation view of a prior art packed bed membrane reactor.
Figure 1B:
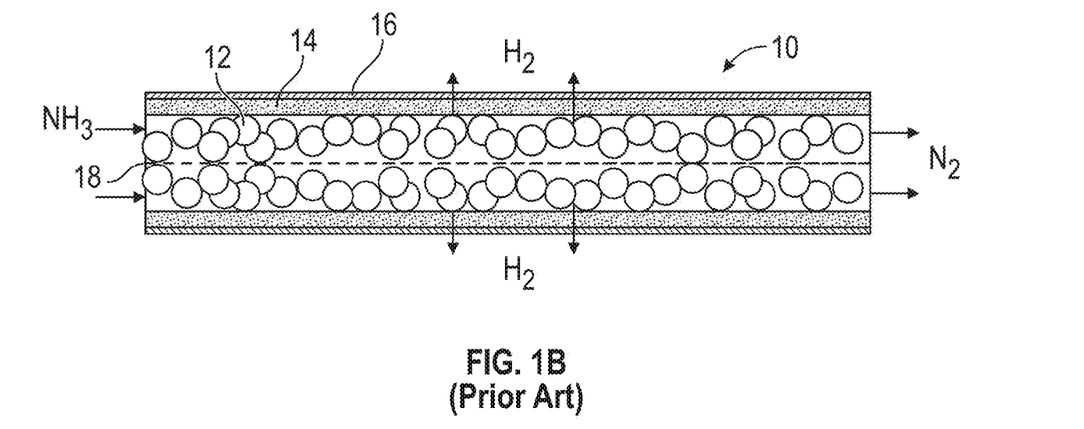
FIG. 1B is a partial cross-sectional elevation view of the prior art packed bed membrane reactor of FIG. 1A taken along line B-B.

Other reactors combine reaction and separation into one unit operation. As shown in FIGS. 1A and 1B, a packed bed membrane reactor 10 has catalyst pellets 12 within the interior of a support 14 and permeable membrane 16. Using a sweep gas, which enhances driving force for permeation, the temperature for complete decomposition in the packed bed membrane reactor 10 can be reduced below 400° C., exceeding equilibrium constraints. However, for hydrogen delivery applications dilution by the sweep gas is not desirable. There are at least two major transport limitations that occur in packed bed membrane reactors 10. First, when using a highly active catalyst, diffusion within pellets 12 can limit its effectiveness. Second, upon exiting an individual pellet 12, the hydrogen must then radially diffuse through the bed 10 and the support 14 to the membrane 16 before being swept away. In sum, previous reactors for decomposing ammonia have several shortcomings that prevent ammonia from becoming a widely used hydrogen carrier in the transportation sector.

SUMMARY

A catalytic membrane reactor and methods of operating and producing the same are provided that address the shortcomings of previous reactors. Embodiments of the catalytic membrane reactors described herein have a significant reduction in temperature, an enhanced recovery of, for instance, hydrogen, and a reduced catalytic loading or amount of catalyst per amount of reactant. Relative to a packed bed reactor membrane, some embodiments of the catalytic membrane reactor described herein achieve a reduction in catalytic loading by an order of magnitude, a reduction in temperature by up to 120° C., enhanced recovery of hydrogen by 35%, and enhanced volumetric productivity rates of greater than 30 mol $m^{-3}s^{-1}$.

It is an aspect of embodiments of the present disclosure to provide a catalytic membrane reactor with a support that is impregnated with a catalyst and plated with a selectively permeable membrane to enhance the recovery of hydrogen. With the catalytic activity occurring in the support rather than pellets within the support, the resulting hydrogen travels only a short distance to a selectively permeable membrane on the outer surface of the support. In addition, in some embodiments, the outer surface of the support is impregnated with the catalyst so the catalytic activity is occurring adjacent, or nearly adjacent, to the permeable membrane. This greatly enhances the recovery of hydrogen in the permeate flow, or the flow on the outer side of the support. Moreover, the catalyst can serve as seeding locations for plating the selectively permeable membrane on the support by, for example, electroless deposition. In some embodiments, the support is an yttria-stabilized zirconium, the catalyst is ruthenium, and the selectively permeable membrane is palladium. Though it will be appreciated that embodiments of the present disclosure encompass any chemical conversion process that can benefit from the systems and methods described herein.

It is another aspect of embodiments of the present disclosure to provide a catalytic membrane reactor with a support that is impregnated with cesium. The addition of cesium to the inner surface of the support enhances the catalytic activity within the catalytic membrane reactor. The inclusion of cesium can reduce the operating temperature to as low as 400° C. without the need for a sweep gas, which is generally undesirable. Specifically, cesium can act as an electron donor and reduce activation energy for the chemical conversion process. The cesium can also increase the density of sites for recombinative nitrogen desorption.

It is a further aspect of embodiments of the present disclosure to provide a catalytic membrane reactor with a support that has a plurality of porosities to enhance the operation of the support. Specifically, in some embodiments, an inner region of the support has a macroporous structure and an outer region has a mesoporous structure such that the support has an asymmetric porosity structure. Stated differently, the support has a first, inner region with a larger porosity than a second, outer region. The first region can have relatively large pores (>1 micron) that permit efficient gas flow in the support, and the second region can have relatively smaller pores (10-200 nm) that enable higher levels of catalyst loading and facilitates the formation of a high quality hydrogen-permeable membrane with good adhesion. Generally, the inner region can be characterized as inert, and the outer region can be characterized as catalytically active. However, it will be appreciated that different regions of the support can be catalytically active including all or part of the first, inner region and/or all or part of the second, outer region.

The thickness of the first or inner region of the support is larger than the thickness of the second or outer region so that fluid such as ammonia can efficiently flow into the support and then react with the high surface area of the second region that is impregnated with the catalyst. In some embodiments, the porosity of the first region can be constant through the thickness of the first region. Similarly, the porosity of the second region can be constant through the thickness of the second region. However, it will be appreciated that the porosity of the first region and/or second region have an increasing or decreasing gradient across the thickness of the region. Further, the support has a constantly decreasing porosity from an inner surface to an outer surface, and the first region can be defined as the non-catalytically active region of the support, and the second region can be defined as the catalytically active region.

It is an aspect of embodiments of the present disclosure to provide a method for manufacturing a catalytic membrane reactor. The characteristics of the yttria-stabilized zirconium support, the ruthenium catalyst, and the palladium selectively permeable membrane must be considered when manufacturing the catalytic reactive membrane reactor to achieve the benefits described herein. For instance, when impregnating the outer surface of a tubular support with a catalyst or plating the outer surface of the support with a selectively permeable membrane, the tubular support is filled with deionized water and sealed at both ends since deionized water is free of contaminants that could result in impurities or imperfections in the final support. Similarly, reducing the support in a furnace at one or more points during the manufacturing process rids the support of impurities such as ruthenium chloride when a ruthenium catalyst is impregnated in the support. With fewer impurities, the recovered hydrogen is purer and less likely to damage any subsequent applications such as use in a fuel cell vehicle.

One specific embodiment of the present disclosure is a catalytic membrane reactor for a chemical conversion process, comprising a ceramic support extending between an inner surface and an outer surface, wherein the ceramic support is impregnated with a metal catalyst that induces or speeds up the chemical conversion process; a first region of the ceramic support extending from the inner surface to a predetermined distance through a thickness of the ceramic support; a second region of the ceramic support extending from the predetermined distance through the thickness of the ceramic support to the outer surface, wherein the second region has a smaller porosity than the first region, the second region has a smaller thickness than the first region, and the second region comprises at least a portion of the metal catalyst; and a permeable membrane positioned on the outer surface of the ceramic support, wherein the permeable membrane has a smaller thickness than the second region, and the permeable membrane selectively allows at least one product of the chemical conversion process to pass through the permeable membrane and blocks at least one product of the chemical conversion process from passing through the permeable membrane.

In some embodiments, the first region has a substantially constant porosity through the thickness of the first region, and the second region has a substantially constant porosity through the thickness of the second region. In various embodiments, the first region has a decreasing porosity from the inner surface of the ceramic support to the predetermined distance through the thickness of the ceramic support, and the second region has a decreasing porosity from the predetermined distance through the thickness of the ceramic support to the outer surface of the ceramic support. In some embodiments, the first region has an average pore size that is greater than 1 micron, and the second region has an average pore size of approximately 0.2 microns. In various embodiments, the ceramic support has a total wall thickness of approximately 0.13 cm, the thickness of the second region is approximately 20 microns, and the thickness of the hydrogen permeable membrane is less than 25 microns.

In some embodiments, wherein a ceramic support material is comprised of at least one of a zirconia, a zirconate, an alumina, a silica, a silicate, or a zeolite, and wherein a metal catalyst material is comprised of at least one of a metal from the platinum group, a transition metal, an alkali metal promoter, or an alkaline metal promoter. In various embodiments, the metal catalyst is impregnated into the outer surface of the ceramic support, and cesium is impregnated into the inner surface of the ceramic support to enhance the chemical conversion process. In some embodiments, the permeable membrane is a hydrogen permeable membrane made of a material comprising at least one of Pd, Pd alloys, Group V metals, or Group V metal alloys. In various embodiments, the chemical conversion process is $NH_3 \leftrightarrows_{1/2} N_2 +_{3/2} H_2$, and hydrogen is selectively allowed to pass through the permeable membrane and nitrogen is blocked by the permeable membrane from passing through the permeable membrane.

Another particular embodiment of the present disclosure is a method of producing an enhanced purity of hydrogen in a chemical conversion process, comprising: (i) moving a fluid having hydrogen into an interior volume of a catalytic membrane reactor, wherein the catalytic membrane reactor comprises: (a) a ceramic support extending between an inner surface and an outer surface, and wherein the inner surface at least partially defines the interior volume, the ceramic support is impregnated with a metal catalyst, and the ceramic support has a smaller porosity proximate to the outer surface than the inner surface; (b) a hydrogen permeable membrane positioned on the outer surface of the ceramic support, wherein the hydrogen permeable membrane at least partially defines an exterior volume of the catalytic membrane reactor; and (ii) reacting the fluid with the metal catalyst in the ceramic support such that such that at least some hydrogen flows through the hydrogen permeable membrane and into a permeate flow in the exterior volume, and a remaining product flows in a retentate flow, or the flow on the inner side of the support, and out of the interior volume.

In various embodiments, the method further comprises (iii) increasing a pressure of the fluid to greater than 1 bar; and (iv) increasing a temperature of the fluid to greater than 350° C. In some embodiments, the fluid is ammonia and the remaining product comprises nitrogen. In various embodiments, the hydrogen is produced according to at least one of the following chemical conversion processes: (a) steam methane reforming: $CH_4 + 2H_2O \leftrightarrows 4H_2 + CO_2$; (b) water gas shift reaction: $CO + H_2O \leftrightarrows CO_2 + H_2$; or (c) dehydrogenation reactions: $C_3H_8 \leftrightarrows C_3H_6 + H_2$. In some embodiments, the ceramic support is made of approximately 3% $Y_2O_3$ and approximately 97% $Zr_2O_3$.

Yet another particular embodiment of the present disclosure is a method of producing a catalytic membrane reactor, comprising: (i) positioning a ceramic support in a first bath comprising a metal catalyst, and impregnating an outer surface of the ceramic support with the metal catalyst; (ii) removing the ceramic support from the first bath and drying the ceramic support; (iii) positioning the ceramic support in a second bath comprising a coating material and plating the outer surface of the ceramic support with the coating material via electroless deposition; (iv) removing the ceramic support from the second bath and drying the ceramic support; and (v) soaking an inner surface of the ceramic support with cesium nitrate to impregnate the inner surface of the ceramic support with cesium.

In some embodiments, the first bath comprises a solution of ruthenium chloride hydrate dissolved in approximately 75% acetone and approximately 25% deionized water. In various embodiments, the method further comprises (vi) covering, prior to positioning the ceramic support in the first bath, a first open end and a second open end of a tubular shape of the ceramic support to seal deionized water within the ceramic support; (vii) uncovering, after removing the ceramic support from the first bath, the first open end and the second open end of the tubular shape of the ceramic support to remove deionized water from the ceramic support; (viii) covering, prior to positioning the ceramic support in the second bath, the first open end and the second open end of the tubular shape of the ceramic support to seal deionized water within the ceramic support; and (ix) uncovering, after removing the ceramic support from the second bath, the first open end and the second open end of the tubular shape of the ceramic support to remove deionized water from the ceramic support.

In some embodiments, the method further comprises (x) covering, prior to soaking the inner surface of the ceramic support, one of a first open end or a second open end of a tubular shape of the ceramic support to retain the cesium nitrate within an interior of the tubular shape of the ceramic support and impregnating the inner surface of the ceramic support with cesium. In various embodiments, the method further comprises (xi) reducing, after removing the ceramic support from the first bath and drying the ceramic support, the impregnated ceramic support in a substantially pure hydrogen environment at approximately 400° C. and approximately 1 bar for approximately 60 minutes. In some embodiments, the method further comprises (xii) comprising agitating the ceramic support in the first bath with ultrasonic vibrations.

The Summary is neither intended nor should it be construed as being representative of the full extent and scope of the present disclosure. The present disclosure is set forth in various levels of detail in the Summary as well as in the attached drawings and the Detailed Description and no limitation as to the scope of the present disclosure is intended by either the inclusion or non-inclusion of elements or components. Additional aspects of the present disclosure will become more readily apparent from the Detailed Description, particularly when taken together with the drawings.

The above-described embodiments, objectives, and configurations are neither complete nor exhaustive. As will be appreciated, other embodiments of the disclosure are possible using, alone or in combination, one or more of the features set forth above or described in detail below.

The phrases "at least one," "one or more," and "and/or," as used herein, are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

Unless otherwise indicated, all numbers expressing quantities, dimensions, conditions, and so forth used in the specification and claims are to be understood as being modified in all instances by the term "about."

The term "a" or "an" entity, as used herein, refers to one or more of that entity. As such, the terms "a" (or "an"), "one or more," and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. § 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description, Abstract, and claims themselves.

BRIEF DESCRIPTION OF THE DRAWINGS

The accompanying drawings, which are incorporated in and constitute a part of the specification, illustrate embodiments of the disclosure and together with the Summary given above and the Detailed Description of the drawings given below, serve to explain the principles of these embodiments. In certain instances, details that are not necessary for an understanding of the disclosure or that render other details difficult to perceive may have been omitted. It should be understood, of course, that the disclosure is not necessarily limited to the particular embodiments illustrated herein. Additionally, it should be understood that the drawings are not necessarily to scale.

Similar components and/or features may have the same reference label. Further, various components of the same type may be distinguished by following the reference label by a letter that distinguishes among the similar components. If only the first reference label is used, the description is applicable to any one of the similar components having the same first reference label irrespective of the second reference label.

A list of the various components shown in the drawings and associated numbering is provided herein:

| Number | Component |
|--------|-----------|
| 10 | Pebble Bed Modular Reactor |
| 12 | Pebble |
| 14 | Support |
| 16 | Membrane |
| 18 | Centerline |
| 20 | Catalytic Membrane Reactor |
| 22 | Support |
| 24 | Membrane |
| 26 | Centerline |
| 28 | First End |
| 30 | Second End |
| 32 | Inner Surface |
| 34 | Outer Surface |
| 36 | Interior Volume |
| 38 | Exterior Volume |
| 40 | First Region |
| 42 | First Thickness |
| 44 | Second Region |
| 46 | Second Thickness |
| 48 | Membrane Thickness |
| 50 | Metal Catalyst |
| 52 | Initial Support |
| 54 | Impregnated Support |
| 56 | Assembled Reactor |
| 58 | Washing Support |
| 60 | Filing Support |
| 62 | Impregnating Support |
| 64 | Drying Support |
| 66 | Reducing Support |
| 68 | Washing Support |
| 70 | Drying Support |
| 72 | Filling Support |
| 74 | Plating Support |
| 76 | Drying Support |
| 78 | Impregnating Support |
| 80 | Drying Support |
| 82 | Reducing Support |

DETAILED DESCRIPTION

The present disclosure has significant benefits across a broad spectrum of endeavors. It is the Applicant's intent that this specification and the claims appended hereto be accorded a breadth in keeping with the scope and spirit of the disclosure being disclosed despite what might appear to be limiting language imposed by the requirements of referring to the specific examples disclosed. To acquaint persons skilled in the pertinent arts most closely related to the present disclosure, a preferred embodiment that illustrates the best mode now contemplated for putting the disclosure into practice is described herein by, and with reference to, the annexed drawings that form a part of the specification. The exemplary embodiment is described in detail without attempting to describe all of the various forms and modifications in which the disclosure might be embodied. As such, the embodiments described herein are illustrative, and as will become apparent to those skilled in the arts, may be modified in numerous ways within the scope and spirit of the disclosure.

Although the following text sets forth a detailed description of numerous different embodiments, it should be understood that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning.

Various embodiments of the present disclosure are described herein and as depicted in the drawings. It is expressly understood that although the figures depict a catalytic membrane reactor, regions of a support, etc., the present disclosure is not limited to these embodiments.

Figure 2A:
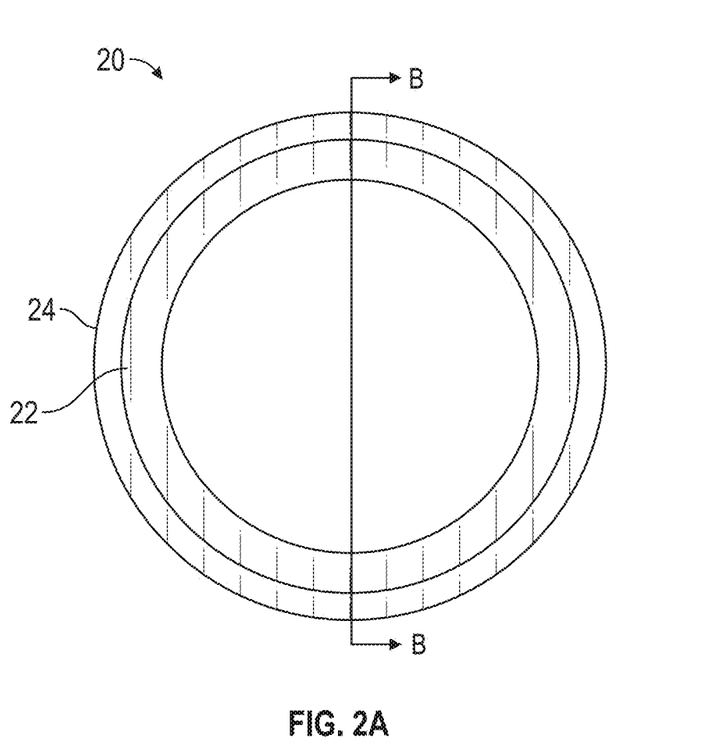
FIG. 2A is an elevation view of a catalytic membrane reactor according to an embodiment of the present disclosure.
Figure 2B:
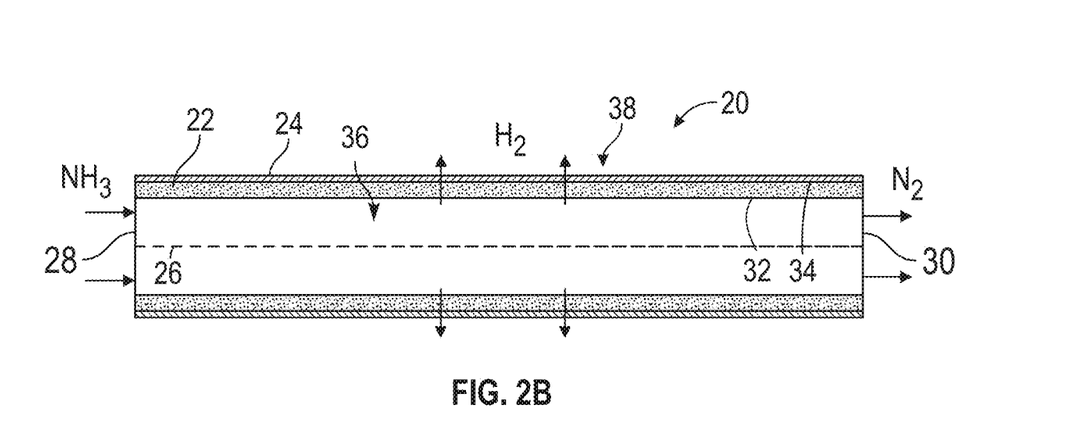
FIG. 2B is a partial cross-sectional elevation view of the catalytic membrane reactor of FIG. 2A taken along line B-B according to an embodiment of the present disclosure.

Now referring to FIGS. 2A and 2B, an elevation view and a cross-sectional view of a catalytic membrane reactor 20 are provided, respectively. The catalytic membrane reactor 20 generally comprises a ceramic support 22 and a hydrogen permeable membrane 24 coated on the ceramic support 22. The ceramic support 22 in this embodiment has a tubular shape extending from a first end 28 to a second end 30 where an inner surface 32 of the ceramic support 22 defines an interior volume 36. In addition, an outer surface 34 of the ceramic support 22 at least partially defines an exterior volume 38 of the catalytic membrane reactor 20. For example, the outer surface 34 of the ceramic support and an outer housing can define the exterior volume 38. A retentate flow moves through the interior volume 36, and a permeate flow moves through the exterior volume 38.

The outer diameter of the support 22 can be between approximately 0.5 and 2 cm in some embodiments where the term "approximately" or "substantially" can mean a variation of up to 10% on a relative basis. In some embodiments, the outer diameter of the support 22 is approximately 1 cm. In FIG. 2B, the catalytic membrane reactor 20 is symmetric about a centerline 26 to define a tubular shape. However, it will be appreciated that the catalytic membrane reactor 20 can have a different shape, for instance, the support 22 and membrane 24 can have a planar shape.

As shown, ammonia ($NH_3$) enters the first end 28 into the interior volume 36 and then reacts within the ceramic support 22 and decomposes into hydrogen ($H_2$) and nitrogen ($N_2$). The hydrogen permeable membrane 24 allows the pure hydrogen to pass through into the exterior volume 38 while blocking the remaining nitrogen, which exits the interior volume 36 at the second end 30. The structure of the catalytic membrane reactor 20 addresses many issues with prior art systems. For instance, the hydrogen travels only a short distance from the catalyst, through the hydrogen permeable membrane 24, and into the permeate flow in the exterior volume 38. While the decomposition of ammonia is depicted in FIGS. 2A and 2B, it will be appreciated that embodiments of the present disclosure encompass a wide variety of chemical conversion processes as described elsewhere herein.

Figure 3A:
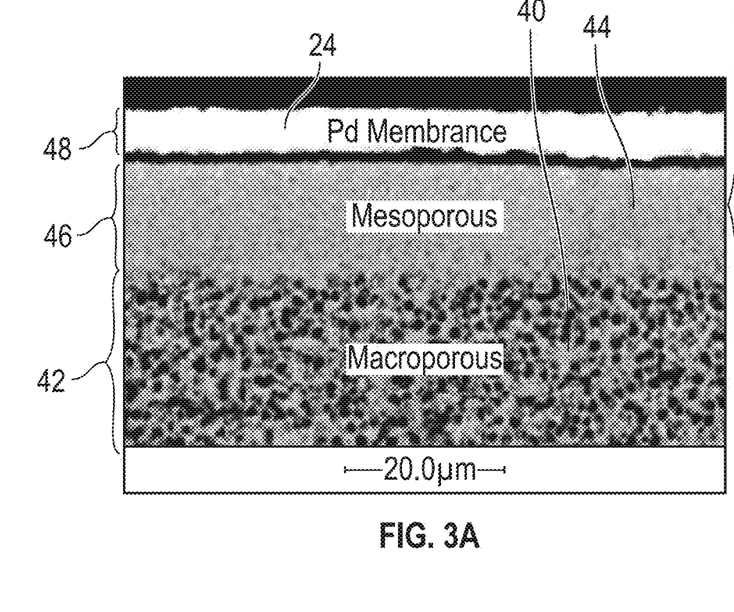
FIG. 3A is a detailed cross-sectional view of a support according to an embodiment of the present disclosure.

Now referring to FIG. 3A, a detailed cross-sectional view of the ceramic support 22 and the hydrogen permeable membrane 24 is provided. The ceramic support 22 in this embodiment generally comprises a first region 40 and a second region 44. The first region 40 promotes gas flow into the ceramic support 22, and the second region 44 has increased surface area within its structure to promote the chemical conversion process. To fulfill these functions, the first region 40 has a larger porosity than the second region 44. This porosity can be constant, gradual, or follow a function across a thickness dimension of the respective regions 40, 44 or even a support 22 without distinct regions. In the depicted embodiment, a thickness 42 of the first region 40 is greater than a thickness 46 of the second region 44 to optimize a balance between fluid flow and catalyzation of the fluid. In addition, the hydrogen permeable membrane 24 has a membrane thickness 48 that is less than the second thickness 46 as only a relatively smaller thickness is needed to selectively allow small molecules to pass through the permeable membrane 24 into the exterior volume.

The total wall thickness of the support, or the combined thicknesses of the first and second regions 40, 44, can be between approximately 0.05 and 0.2 cm in some embodiments. In various embodiments, the total thickness is approximately 0.13 cm. The thickness 42 of the first region 40 can be between approximately 0.05 and 0.2 cm in some embodiments. In various embodiments, the thickness 42 of the first region 40 is approximately 0.128 cm. The thickness 46 of the second region 44 can be between approximately 5 and 30 microns in some embodiments. In various embodiments, the thickness 46 of the second region 44 is approximately 20 microns. The thickness 48 of the membrane 24 is between approximately 2 and 15 microns in some embodiments. In various embodiments, the thickness 48 of the membrane 24 is approximately 6.2 microns.

Figure 3B:
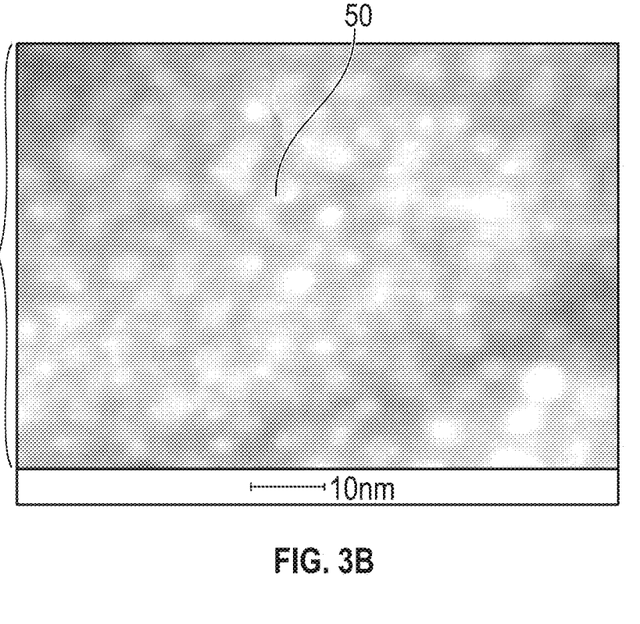
FIG. 3B is a further detailed cross-sectional view of an outer region of the support in FIG. 3A according to an embodiment of the present disclosure.

Now referring to FIG. 3B, an even more detailed cross-sectional view of the second, outer region 44 of the ceramic support 22 is provided. This view shows the metal catalyst 50 that is impregnated into the outer surface of the ceramic support 22 to facilitate a chemical conversion process. The average catalyst crystalline size is between approximately 2 and 7 nm in some embodiments as a size below 0.8 nm is too small to be catalytically active. In various embodiments, the average catalyst crystalline size is approximately 3.8±2.1 nm, which corresponds to a dispersion of 34%.

Figure 4:
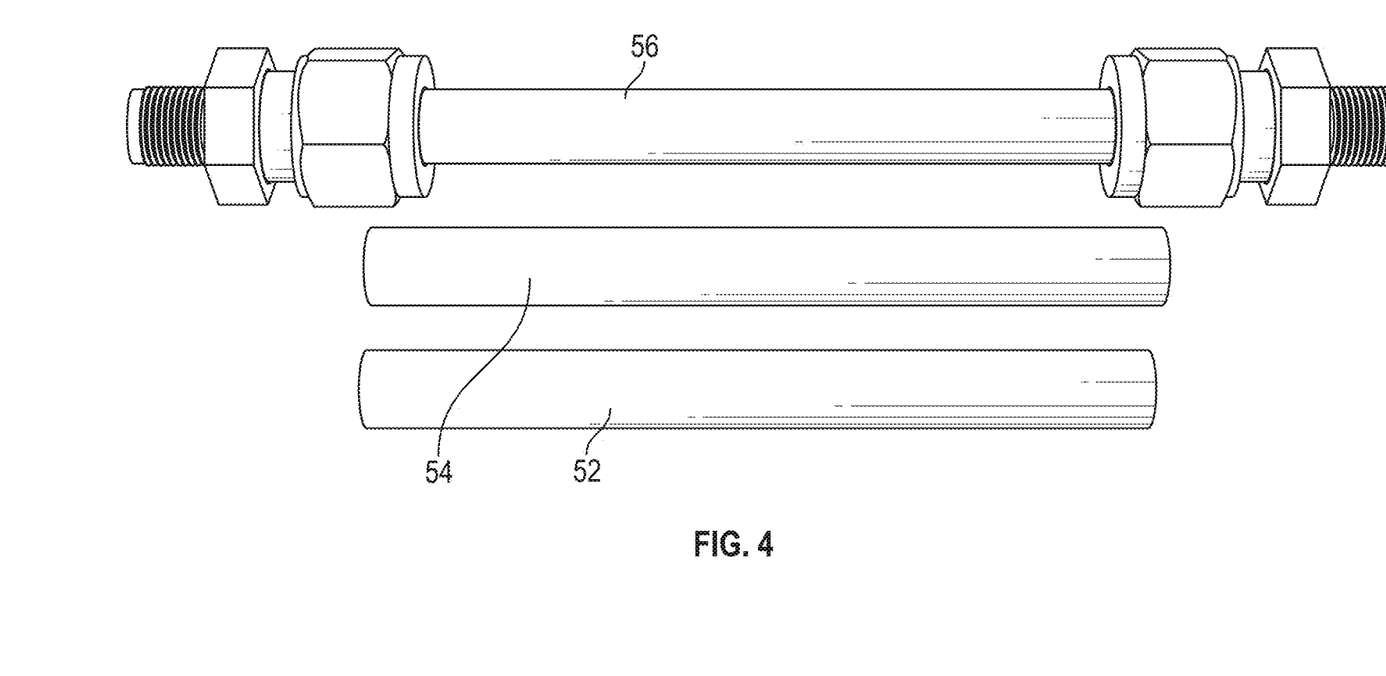
FIG. 4 is a top plan view of a catalytic membrane reactor in various stages of assembly according to an embodiment of the present disclosure.

Now referring to FIG. 4, a top view of various components of a catalytic membrane reactor 20 is provided. The initial support 52 is shown, which is a ceramic support in some embodiments. Next, the initial support 52 is impregnated with a metal catalyst to form an impregnated support 54. Then, the impregnated support 54 is plated with a permeable membrane and positioned in a housing to form the assembled catalytic membrane reactor 56. The operating conditions within the catalytic membrane reactor 20 can include a working fluid (e.g., ammonia) pressure of greater than approximately 1 bar in some embodiments. In various embodiments, the working fluid pressure is between approximately 1 to 5 bars. The temperature of the working fluid can be greater than approximately 300° C. in some embodiments. In various embodiments, the temperature of the working fluid can be greater than approximately 350° C. Further still, the temperature of the working fluid can be greater than approximately 400° C. in some embodiments.

Figure 5A:
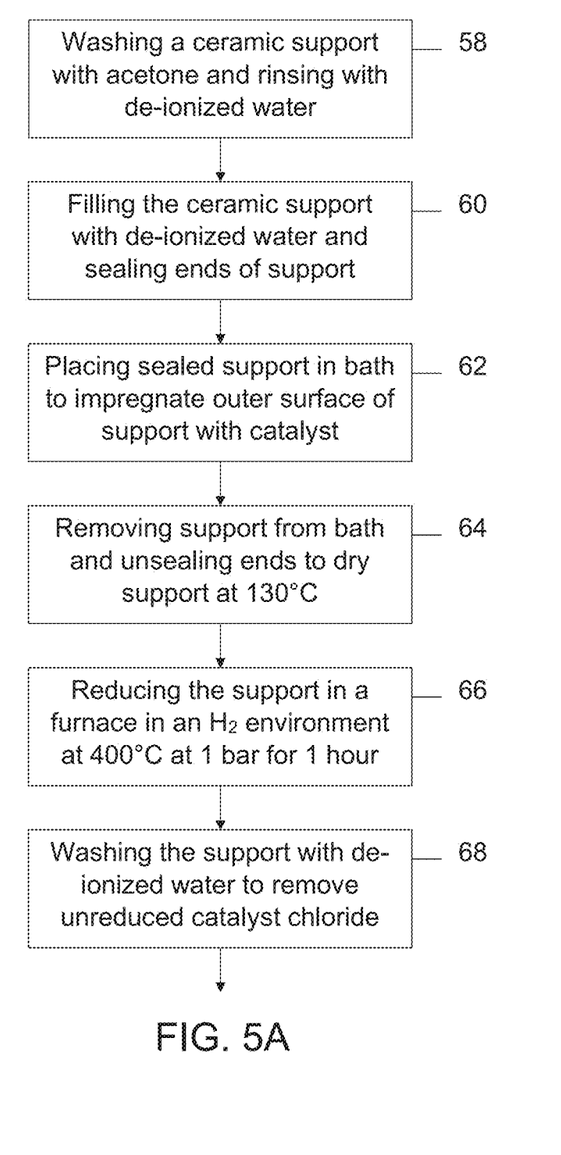
FIGS. 5A and 5B show a flowchart for a process of producing a support for a catalytic membrane reactor according to an embodiment of the present disclosure.
Figure 5B:
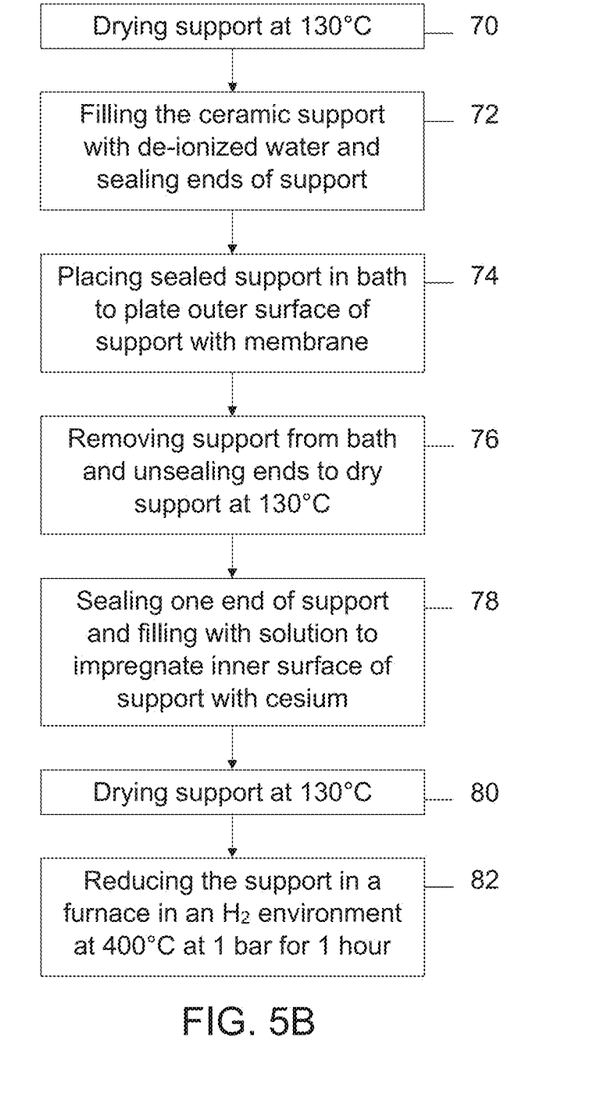

Now referring to FIGS. 5A and 5B, an exemplary process for manufacturing a catalytic membrane reactor is provided. The process minimizes impurities since the resulting permeate flow from the catalytic membrane reactor is likely to be used in highly sensitive applications such as fuel cell vehicles. Any values or ratios of the method of manufacturing can be "approximate" such that the present disclosure encompasses embodiments of the method with values or ratios other than those explicitly recited below. First, the initial support is washed 58 with acetone and rinsed with deionized water. Then, the support is filled 60 with deionized water, and the ends of the support are covered to seal the deionized water within the support. When the support is a tubular shape, the openings at each end of the support are covered or capped with a material such as Teflon®. However, it will be appreciated that in various embodiments, the support can have, for example, a planar shape. In these embodiments, the inner surface of the support is sealed with deionized water.

The sealed support is placed 62 in a bath comprising a solution of ruthenium chloride hydrate dissolved in 75% acetone and 25% deionized water. The bath is agitated with ultrasonic vibrations at room temperature for approximately 30 minutes to impregnate the outer surface of the support with a ruthenium catalyst. Then, the support is removed from the bath and dried 64 in air at 130° C. Next, the support is reduced 66 in a furnace with a pure hydrogen environment at 400° C. at 1 bar for approximately 60 minutes to remove any ruthenium chloride. After being reduced, the support is washed 68 with deionized water to further remove any ruthenium chloride. The support is dried 70 again in the air at 130° C. The resulting catalytic loading of the ruthenium in the support is between 0.2 and 0.8% by weight in some embodiments. In various embodiments, the catalytic loading of ruthenium in the support is approximately 0.41% by weight.

Next, the outer surface of the support is plated with a selectively permeable membrane, and the inner surface of the support is impregnated with cesium to promote the chemical conversion process. The support impregnated with the ruthenium catalyst is filled 72 with deionized water, and the ends of the support are covered to seal the deionized water within the support. Then, the support is placed 74 in a bath comprising plating solution, and the bath is agitated with ultrasonic vibrations for approximately 120 minutes. This cycle can be repeated a number of times, including four times, to plate the outer surface of the support with, for instance, palladium. The support is emptied of deionized water and dried 76 in the air at 130° C.

Next, one end of the support is covered, and the support is filled 80 with cesium nitrate for approximately 120 minutes to impregnate the inner surface of the support with cesium. Then, the support is emptied and dried 80 in the air at 130° C. Lastly, the support is reduced in a furnace in a pure hydrogen environment at 400° C. at 1 bar for approximately 60 minutes to remove any impurities. The resulting molar ratio of ruthenium to cesium is between approximately 1 and 2 in some embodiments. In various embodiments, the ratio is approximately 1.5.

The improved transport in the catalytic membrane reactor enabled reduced operating temperature (>120° C.), reduced catalyst loading (>10×), and enhanced $H_2$ productivity (>6×) compared to packed bed membrane reactors. Nominally complete $NH_3$ conversion was achieved at operating temperatures as low as 400° C., exceeding equilibrium limitations. Very high $H_2$ volumetric productivity of 31.6 mol $m^{-3}s^{-1}$ was obtained.

The description of the present disclosure has been presented for purposes of illustration and description, but is not intended to be exhaustive or limiting of the disclosure to the form disclosed. Many modifications and variations will be apparent to those of ordinary skill in the art. The embodiments described and shown in the figures were chosen and described in order to best explain the principles of the disclosure, the practical application, and to enable those of ordinary skill in the art to understand the disclosure.

While various embodiments of the present disclosure have been described in detail, it is apparent that modifications and alterations of those embodiments will occur to those skilled in the art. Moreover, references made herein to "the present disclosure" or aspects thereof should be understood to mean certain embodiments of the present disclosure and should not necessarily be construed as limiting all embodiments to a particular description. It is to be expressly understood that such modifications and alterations are within the scope and spirit of the present disclosure, as set forth in the following claims.

What is claimed is:

1. A catalytic membrane reactor for a chemical conversion process, comprising:
    a ceramic support extending between an inner surface and an outer surface, wherein a metal catalyst is impregnated into said outer surface of said ceramic support to provide a non-uniform distribution of said metal catalyst in said ceramic support, wherein said metal catalyst induces or speeds up said chemical conversion process;
    a first region of said ceramic support extending from said inner surface to a predetermined distance through a thickness of said ceramic support;
    a second region of said ceramic support extending from said predetermined distance through said thickness of said ceramic support to said outer surface, wherein said second region has a smaller porosity than said first region, said second region has a smaller thickness than said first region, and said second region comprises at least a portion of said metal catalyst; and
    a permeable membrane positioned on said outer surface of said ceramic support, wherein said permeable membrane has a smaller thickness than said second region, and said permeable membrane selectively allows at least one product of said chemical conversion process to pass through said permeable membrane and blocks at least one product of said chemical conversion process from passing through said permeable membrane.

2. The catalytic membrane reactor of claim 1, wherein said first region has a substantially constant porosity through said thickness of said first region, and said second region has a substantially constant porosity through said thickness of said second region.

3. The catalytic membrane reactor of claim 1, wherein said first region has a decreasing porosity from said inner surface of said ceramic support to said predetermined distance through said thickness of said ceramic support, and said second region has a decreasing porosity from said predetermined distance through said thickness of said ceramic support to said outer surface of said ceramic support.

4. The catalytic membrane reactor of claim 1, wherein said first region has an average pore size that is greater than 1 micron, and said second region has an average pore size of approximately 0.2 microns.

5. The catalytic membrane reactor of claim 1, wherein said ceramic support has a total wall thickness of approximately 0.13 cm, said thickness of said second region is approximately 20 microns, and said thickness of said hydrogen permeable membrane is less than 25 microns.

6. The catalytic membrane reactor of claim 1, wherein a ceramic support material is an yttria-stabilized zirconium.

7. The catalytic membrane reactor of claim 1, wherein cesium is impregnated into said inner surface of said ceramic support to enhance said chemical conversion process, wherein said metal catalyst is ruthenium and a molar ration of said ruthenium to said cesium is between 1 and 2.

8. The catalytic membrane reactor of claim 1, wherein said permeable membrane is a hydrogen permeable membrane made of a material comprising at least one of Pd, Pd alloys, Group V metals, or Group V metal alloys.

9. The catalytic membrane reactor of claim 1, wherein said chemical conversion process is $NH_3 \leftrightarrows {}_{1/2}N_2 + {}_{3/2}H_2$, and hydrogen is selectively allowed to pass through said permeable membrane and nitrogen is blocked by said permeable membrane from passing through said permeable membrane.

10. A method of producing an enhanced purity of hydrogen in a chemical conversion process, comprising:
    moving fluid having hydrogen into an interior volume of a catalytic membrane reactor, wherein said catalytic membrane reactor comprises:
        a ceramic support extending between an inner surface and an outer surface, and wherein said inner surface at least partially defines said interior volume, said outer surface of said ceramic support is impregnated with a metal catalyst, and said ceramic support has a smaller porosity proximate to said outer surface than said inner surface;
        a hydrogen permeable membrane positioned on said outer surface of said ceramic support, wherein said metal catalyst serves as seeding locations for said hydrogen permeable membrane, and said hydrogen permeable membrane is a distinct material from said ceramic support, wherein said hydrogen permeable membrane at least partially defines an exterior volume of said catalytic membrane reactor; and
    reacting said fluid with said metal catalyst in said ceramic support such that at least some hydrogen flows through said hydrogen permeable membrane and into a permeate flow in said exterior volume, and a remaining product flows in a retentate flow and out of said interior volume.

11. The method of claim 10, further comprising:
    increasing a pressure of said fluid to greater than 1 bar; and
    increasing a temperature of said fluid to no more than 400° C.

12. The method of claim 10, wherein said fluid is ammonia and said remaining product comprises nitrogen.

13. The method of claim 10, wherein said ceramic support is made of approximately 3% $Y_2O_3$ and approximately 97% $Zr_2O_3$.

14. A method of producing a catalytic membrane reactor, comprising:
- positioning a ceramic support in a first bath comprising a metal catalyst, and impregnating an outer surface of said ceramic support with said metal catalyst;
- removing said ceramic support from said first bath and drying said ceramic support;
- positioning said ceramic support in a second bath comprising a coating material and plating said outer surface of said ceramic support with said coating material via electroless deposition;
- removing said ceramic support from said second bath and drying said ceramic support; and
- soaking an inner surface of said ceramic support with cesium nitrate to impregnate said inner surface of said ceramic support with cesium.

15. The method of claim 14, wherein said first bath comprises a solution of ruthenium chloride hydrate dissolved in approximately 75% acetone and approximately 25% deionized water.

16. The method of claim 14, further comprising:
- covering, prior to positioning said ceramic support in said first bath, a first open end and a second open end of a tubular shape of said ceramic support to seal deionized water within said ceramic support;
- uncovering, after removing said ceramic support from said first bath, said first open end and said second open end of said tubular shape of said ceramic support to remove deionized water from said ceramic support;
- covering, prior to positioning said ceramic support in said second bath, said first open end and said second open end of said tubular shape of said ceramic support to seal deionized water within said ceramic support; and
- uncovering, after removing said ceramic support from said second bath, said first open end and said second open end of said tubular shape of said ceramic support to remove deionized water from said ceramic support.

17. The method of claim 14, further comprising covering, prior to soaking said inner surface of said ceramic support, one of a first open end or a second open end of a tubular shape of said ceramic support to retain said cesium nitrite within an interior of said tubular shape of said ceramic support and impregnating said inner surface of said ceramic support with cesium.

18. The method of claim 14, further comprising reducing, after removing said ceramic support from said first bath and drying said ceramic support, said impregnated ceramic support in a substantially pure hydrogen environment at approximately 400° C. and approximately 1 bar for approximately 60 minutes.

19. The method of claim 14, further comprising agitating said ceramic support in said first bath with ultrasonic vibrations.

20. The method of claim 10, wherein said metal catalyst is ruthenium and said inner surface of said ceramic support is impregnated with cesium, and a molar ratio of said ruthenium to said cesium is between 1 and 2, wherein a loading of said ruthenium is between 0.2 and 0.8% by weight.

* * * * *